July 1, 1941. G. A. TINNERMAN 2,247,975
FASTENING INSTALLATION AND FASTENER THEREFOR
Filed April 16, 1940 2 Sheets-Sheet 1
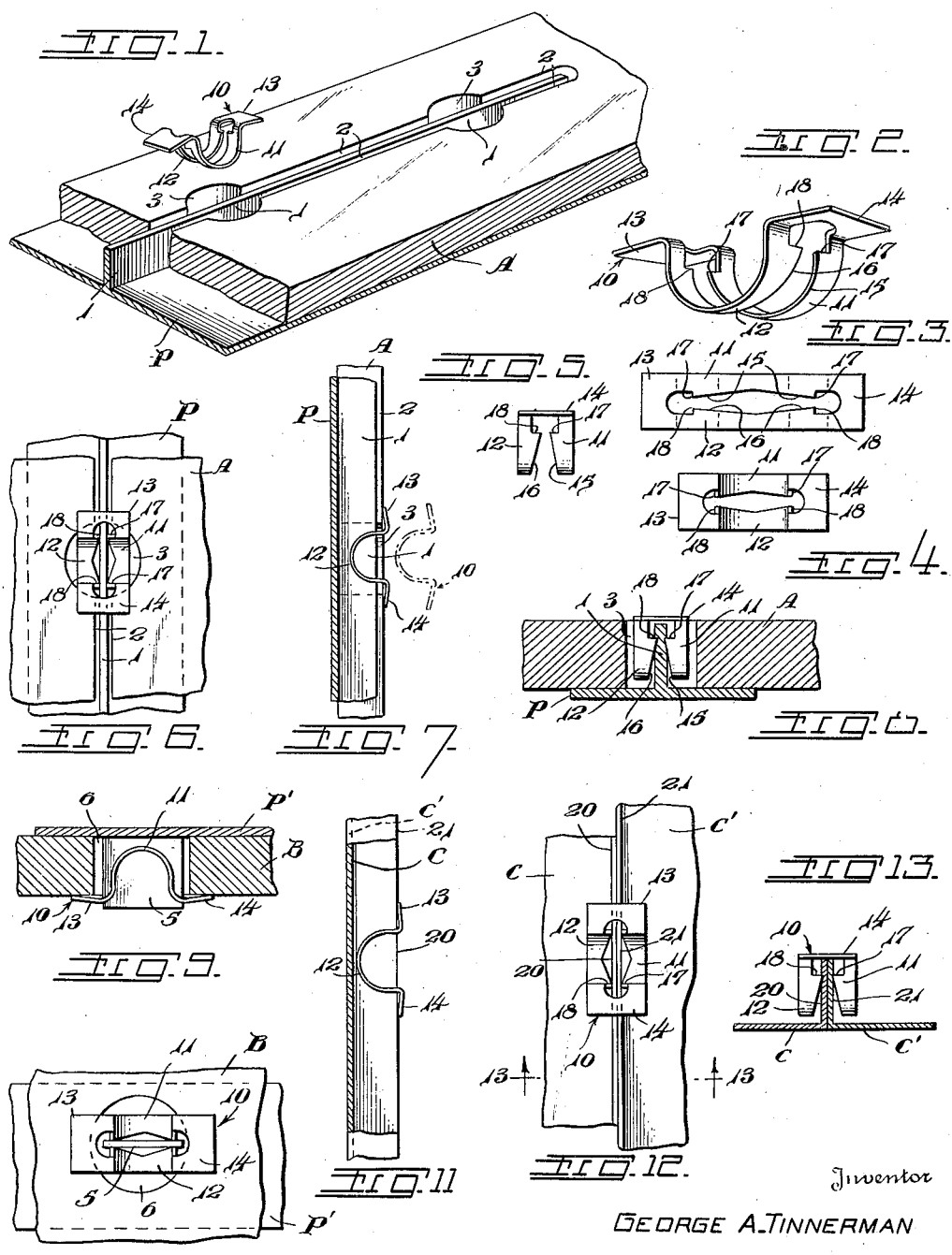
Inventor
GEORGE A. TINNERMAN
By H. G. Lombard
Attorney July 1, 1941.   G. A. TINNERMAN   2,247,975
FASTENING INSTALLATION AND FASTENER THEREFOR
Filed April 16, 1940   2 Sheets-Sheet 2
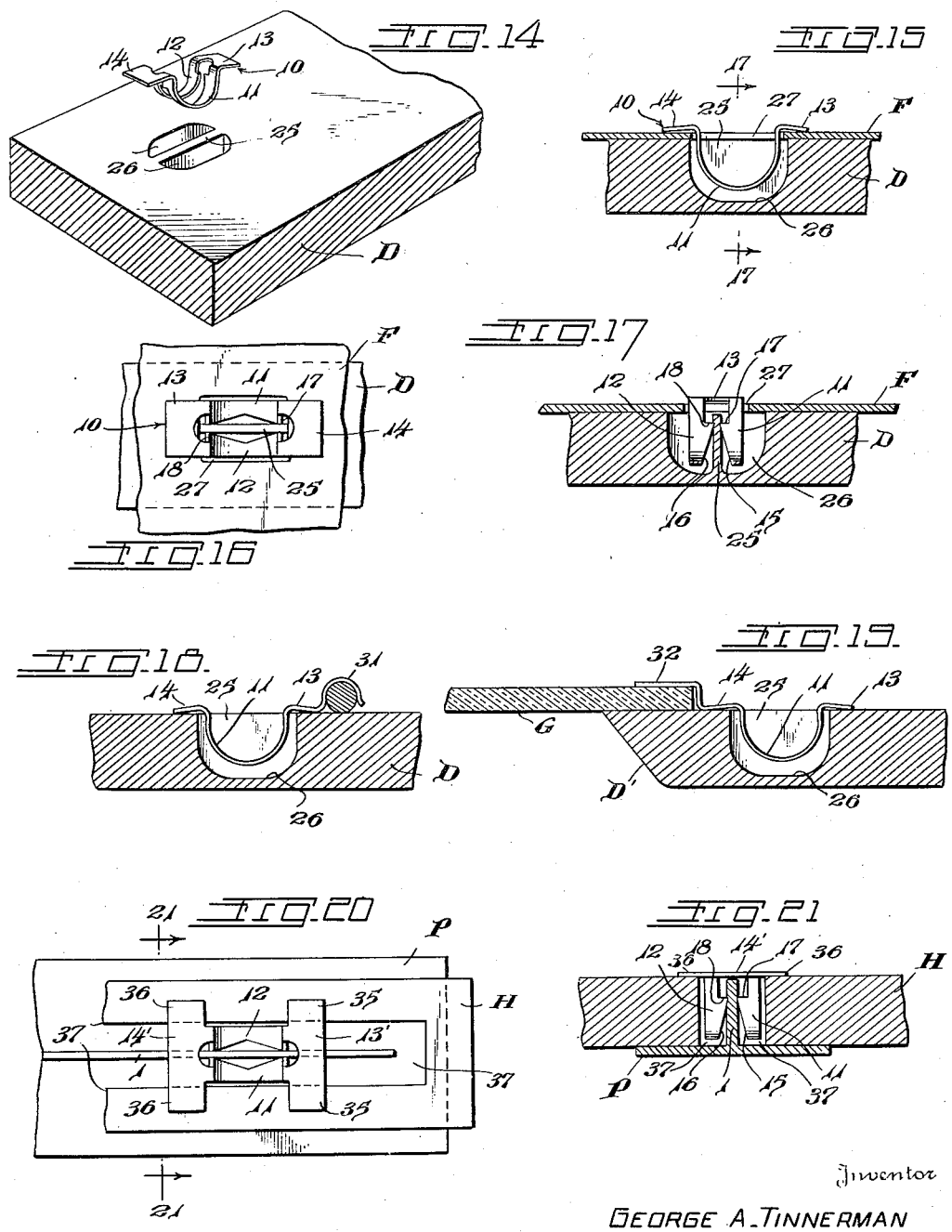
Inventor
GEORGE A. TINNERMAN Patented July 1, 1941

2,247,975

UNITED STATES PATENT OFFICE 2,247,975

FASTENING INSTALLATION AND FASTENER THEREFOR

George A. Tinnerman, Cleveland, Ohio, assignor to Tinnerman Products, Inc., Cleveland, Ohio, a corporation of Ohio Application April 16, 1940, Serial No. 329,950

20 Claims. (Cl. 189—36)

This invention relates in general to improvements in clip fastened installations and deals both with an improved form of clip fastener device and various new applications and uses of such a clip fastener for securing cooperating parts in an installation or for attaching an object or article of manufacture to a structural part such as a panel member or the like.

More particularly, the present invention is directed to an improved fastening arrangement in which the part to which the clip is applied for securing purposes is necessarily or desirably provided with connecting stud means in the form of an elongated rib, or the like, or one or more equivalent rib sections defining generally flat connecting stems or similar connecting stud elements. It will be understood that the various fastening installations embodying the improved clip fastener of the present invention are of general utility and have a wide range and variety of uses in that practically any part to be secured whether plastic, metal, wood or composition material, may be expediently provided with a suitable form of such connecting stud means, and particularly in the manner of a connecting rib or equivalent rib section, flat stem, or the like.

In this respect in addition to numerous advantages in manufacture and handling, a most important problem is solved in the provision of certain widely used types of molded plastic parts with means for securing the same in an installation while also producing such plastic parts without mold imperfections such as shrinkage marks, porous rough spots, gas cavities, etc. For example, many parts constructed of plastic material are of such form as to embody considerable width and length and yet a relatively thin thickness. In the molding of such a plastic part, therefore, only a certain size connecting stud means will be satisfactory since if the connecting stud is of a thickness or diameter greater than the adjacent thickness of the plastic part, generally speaking, the plastic material frequently will not flow properly to form the connecting stud with the result that such stud will be only partly formed, and fragile or otherwise imperfect to the extent the entire molded plastic part is useless inasmuch as it cannot be fastened properly in the manner intended. Furthermore, when such a molded plastic part of relatively thin thickness is cooled to hardened form, if the stud is of greater diameter than such thickness, a shrinkage takes place in the area of the stud itself causing the adjacent material of the plastic part to ontract and form an objectionable dimple on the exposed finish surface thereof.

It has been found that any such mold imperfections may be avoided and the connecting stud means on a plastic part otherwise satisfactorily provided so long as the diameter or thickness thereof is less or not materially greater than that of the thickness of the adjacent area of the plastic part itself. This, of course, often requires that the connecting stud means be of very thin cross-section and in order to adapt the same for the required strength, such connecting stud means is best provided in many cases in the manner of an elongated relatively thin rib or rib sections defining generally flat connecting studs or stems. In this respect, similar connecting stud means, of course, may be readily provided on a wood or metal part while in the case of a sheet metal part, an equivalent form of connecting rib or the like may be provided by a simple tongue element which is struck out therefrom, welded, riveted or otherwise secured thereto in any suitable manner.

A primary object of the present invention is to provide various fastening installations embodying a part having connecting stud means of such character together with an improved form of clip fastener which is simple, inexpensive and particularly adapted for easy and quick application to secure such an installation in a most practical and effective manner.

Another principal object of the invention is for the provision of a clip fastener comprising cooperating securing elements providing a spring gripping action with such connecting stud means in a manner to engage the same on opposite face portions thereof to effect a reliable fastening installation in which the parts secured are not subject to loosening or displacement even under extreme conditions of shock, vibratory motion, jarring effects and the like.

A more specific object of the invention contemplates the provision of such a clip fastener comprising securing elements engaging the opposite faces of such connecting stud means in the form of a rib, or the like, by substantial spring gripping action at a plurality of spaced points and further, with such securing elements including an improved, highly effective form of anchoring means of relatively simple construction making for economy in the manufacture of such clips and speed and facility in the application and general use thereof in a wide range and variety of installations.

A further object of the invention is for the provision of such clip fasteners in the manner of simple, one-piece, sheet metal devices which are cheap and inexpensive to provide and lend themselves to economical quantity production in that they may be produced at relatively low cost from ordinary sheet metal strip stock, for example, with little loss or waste of material.

Further objects and advantages and other new and useful features in the construction, arrangement and general combination of parts of the invention will be readily apparent to those skilled in the art as a description thereof proceeds with reference to the accompanying drawings, for purposes of illustration but not of limitation, in which like reference characters designate like parts throughout the same, and in which:

Fig. 1 is a perspective view looking from the underside of an installation embodying a part provided with a connecting rib assembled in a slot in a cooperating part and showing a clip fastener in position to be applied thereto to secure such parts;

Fig. 2 is a perspective on an enlarged scale of the clip fastener per se showing the detailed construction thereof;

Fig. 3 illustrates the blank outline or strip section from which the clip fastener is constructed;

Fig. 4 is a top view of a completed fastener showing the blank of Fig. 3 as foreshortened to provide the spaced, generally U-shaped securing elements thereof;

Fig. 5 is an end elevational view of the completed fastener showing one form of anchoring means and cam guide surfaces provided on the spaced inner edge portions of the securing elements thereof;

Fig. 6 is a plan view showing the clip in applied fastening position securing the parts of the installation shown in Fig. 1;

Fig. 7 is a longitudinal sectional view of Fig. 6 showing the clip in side elevation; and, Fig. 8 is a transverse sectional view of Figs. 6 and 7 showing the position of the securing elements of the clip as applied to the connecting rib element to secure the installation.

Fig. 9 is a vertical sectional view of a further embodiment of the invention in which there is employed generally flat connecting stud or rib sections to which the clip fastener is applied; and, Fig. 10 is a bottom plan view of Fig. 9.

Figs. 11 to 13 inclusive show another form of the invention wherein the cooperating secured parts include complementary flange portions which together present a connecting rib element or the like to which the clip is applied, Fig. 11 being a vertical sectional view of such an installation;

Fig. 12 is a plan view of Fig. 11 showing the clip as applied to straddle the complementary rib portions of such cooperating parts; and, Fig. 13 is a transverse sectional view of Fig. 12;

Fig. 14 is a perspective showing the manner of application of the clip fastener to a pocketed connecting rib element provided in a supporting part to which a cooperating part is to be secured, or on which an object or article is to be mounted;

Fig. 15 is a sectional view showing an apertured panel member, or the like, secured by the clip fastener applied to such a pocketed connecting rib element provided in a supporting part;

Fig. 16 is a top plan view of Fig. 15, and,

Fig. 17 is a sectional view of Fig. 15 taken on line 17—17, looking in the direction of the arrows.

Fig. 18 is a sectional view showing the clip as applied to such a pocketed rib element in a supporting part and provided with means for mounting thereon an object such as a wire, cable, rod, tube or the like;

Fig. 19 is a similar view showing the clip as modified to mount a cooperating panel member or the like on the supporting part.

Fig. 20 is a plan view showing another form of the clip fastener as provided with wing portions straddling a recess in a part to which a cooperating part is secured by a connecting rib element or the like similar to the installation of Fig. 1; and, Fig. 21 is a transverse sectional view of Fig. 20 taken on line 21—21 looking in the direction of the arrows.

Referring now, more particularly, to Figs. 1–8 inclusive of the drawings, one form of installation embodying the improved clip fastener of the present invention is illustrated in Fig. 1 wherein a part P is provided with a suitable connecting stud means in the form of a rib or rib section 1 and which in the case of a molded plastic part, for example, is integrally provided on the rearward face of such plastic part. As previously pointed out, to avoid possible imperfections such as those due to shrinkage in the area of a relatively thin portion of any such plastic part incident to the molding thereof, said connecting stud means is preferably provided in the manner of a thin rib or flange element of any desired or suitable length to provide the required strength therein; of course, a rib of continuous length is desirable wherever possible to provide for maximum strength in addition to the advantageous reinforcing qualities supplied thereby to any plastic part, and particularly in rigidifying the outer surface of a relatively thin part to minimize the possibility of accidental cracking or breaking thereof.

The cooperating supporting part A of any suitable material comprises a panel or plate-like portion which is prepared with an area for attaching the part P thereto, such area consisting of an elongated slot 2 or the like including one or more enlarged recesses 3 of any suitable outline, preferably round, inasmuch as such openings are the easiest to provide in the molding of a plastic part or by punching or drilling any part to be secured. Said recesses 3 are preferably provided in part A in a predetermined spaced relation longitudinally of said slot 2 along the general path which the part P extends in assembled relation therewith as shown in Fig. 1, wherein the connecting rib 1 is received in said elongated slot 2 and substantially bisects the adjacent enlarged recesses 3 thereof.

In this relation, the part P is firmly seated against the cooperating part A and these members are thereupon adapted readily to be secured by a preferred form of clip fastener, designated generally 10, Fig. 1, having spaced securing elements which are received in the recess 3 from the adjacent or rearward side of part A to grip the intermediate portion of rib 1 on its opposite faces in securing relation with part P. A head or base defined by one or both end portions of the clip bridges the slot 2 and bears upon the adjacent face of part A to fasten part P thereto in the applied fastening position of the clip to complete the installation, as hereinafter more fully set forth.

The preferred form of clip fastener, as best seen in Fig. 2, is a simple, very inexpensive article to manufacture inasmuch as it requires few punching and forming operations and may be provided from a relatively small section of any suitable sheet metal, preferably spring metal such as spring steel or cold rolled steel. The clip, of course, may be formed from sheet metal sections of various outlines, but from a quantity production standpoint, is most advantageously provided from a comparatively small, generally rectangular blank obtained from ordinary sheet metal strip stock with very little loss or waste of material. Fig. 3 shows such a blank or stamping as provided with a preferred form of punched opening or cutout area presenting spaced longitudinal side sections 11, 12, and end sections 13, 14. The blank is bent into the general configuration shown in Fig. 2 in a manner whereby said side sections 11, 12, define generally U-shaped securing elements or spring arms provided with the end sections 13, 14, either or both of which serve as the head or base portion of the clip. The cutout area of the blank shown in Fig. 3 has preferably a generally diamond shaped outline defining angularly disposed intersecting edges 15 and 16 on the side sections 11 and 12, respectively. The diamond shaped cutout includes enlarged generally D-shaped openings at the approximate corners thereof providing the desired form of shoulders 17, 18, on the opposing inner edges of said side sections 11, 12, respectively, and extending the end walls of the cutout opening into the areas of the respective base sections 13, 14.

When the blank thus provided is bent substantially as indicated by the dotted lines in Fig. 3, said side sections are formed into intermediate bent portions defining the spaced, generally U-shaped securing elements or bent spring arms 11, 12, of the completed clip, Fig. 2, with said end sections providing the head or base portions 13, 14 extending from such securing elements in any suitable manner, as in generally opposite directions. If desired, either or both of such sections 13, 14 may be of such length and size as to be shaped into means for holding an article such as a rod, cable or other object. The blank area is thus foreshortened to the size shown in Fig. 4 and, in this relation, viewing the completed clip in end elevation as in Fig. 5, the opposing inner edges 15, 16 of said side sections 11, 12 of the blank, as bent to define said U-shaped securing elements or spring arms, present inclined cam or guide surfaces which are preferably designed to appear in the manner of an inverted substantial V-shape tapering outwardly in the direction opposite the head or base of the clip defined by the end sections 13, 14.

Also in this bent configuration of the side sections 11, 12 to provide the spaced generally U-shaped securing elements or bent spring arms, the shoulders 17, 18, Fig. 5, define anchoring means on the opposing inner edge portions thereof in the form of substantial teeth suitably spaced from the base portions 13, 14, of the clip in the approximate area of the apex of said V-shaped cam or guide surfaces 15, 16. Said teeth 17, 18, thus provided, are rigidly disposed on the inner edge portions of the U-shaped securing elements 11, 12, and present small pointed edges adapted to engage opposite faces of a connecting rib, stud or the like applied therebetween. The generally U-shaped securing elements or spring arms 11, 12 of the completed clip are adapted to flex or yield edgewise under force by reason of the cutout or opening therebetween and thus have a resilient spring gripping action which is of exceptional intensity due to the bent configuration of said securing elements. Accordingly, under the force of such resilient spring gripping action of the securing elements 11, 12, the teeth 17, 18, on the inner edge portions thereof are adapted for a pronounced biting action under tension on opposite faces of a connecting rib element or the like applied in the space between the inner edges 15, 16 thereof, it being understood, of course, that the thickness of said rib element or the like is at least slightly greater than the space between such teeth 17, 18, in the normal untensioned relation of the securing elements 11, 12 of the completed clip as shown in Fig. 5.

Such biting engagement of the teeth 17, 18, of course, provides a rigid, positive locking action in fastening position in a manner whereby the clip cannot become dislodged or even readily removed. In the event a readily removable arrangement for the clip is desired, the elements defining the teeth 17 are provided in the manner of blunt shoulders having a substantial sliding action with the surfaces engaged thereby and thus permitting the clip to be readily withdrawn while at the same time providing a firm, rigid securing action in fastening position by reason of the resilient spring gripping qualities of the U-shaped securing elements or bent spring arms 11, 12.

With the clip provided substantially as shown in Figs. 2, 4 and 5, it will be understood on referring to the installation of Figs. 1, 6, 7 and 8, that the clip is applied to the enlarged recess 3 in supporting part A with the spaced generally U-shaped securing elements 11, 12 receiving the connecting rib 1 lengthwise in the space between the opposing inner edges 15, 16, of said securing elements. The height of said securing elements 11, 12 is preferably less than the depth of said recess 3 to be fully received therein with said teeth 17, 18 engaging on opposite faces of the connecting rib 1 at points removed from the free end thereof. As stated, the spacing of said teeth in the normal untensioned relation of the clip, is at least slightly less than the thickness of the rib portion engaged thereby while the adjoining edges 15, 16, Fig. 5, taper outwardly therefrom in presenting a somewhat wider space between the inner edges of the securing elements 11, 12, at the leading portions thereof. Accordingly, the associated connecting rib portion is easily and quickly received in the space between the inner edge portions of said securing elements 11, 12 in the initial step of applying the clip to fastening position, as illustrated in Fig. 1 and by the dotted line showing in Fig. 7.

Thus, the clip is applied into the recess 3 with the U-shaped securing elements or spring arms 11, 12, straddling the adjacent rib portion 1 in such recess, and, as the clip is pushed toward fastening position, the inclined cam or guide surfaces 15, 16, on the opposing inner edges of the U-shaped securing elements 11, 12, cause a gradual spreading of said securing elements in a manner whereby the teeth 17, 18 are readily eased over the free end of the rib 1, to engage the same on opposite faces at points removed from such free end in the final applied fastening position of the clip, substantially as shown in Fig. 8. The head or base portions 13, 14 of the clip thus bridge the slot 2, Fig. 6, and bear upon the adjacent rearward face of part A to hold the clip in such fastening position securing the part P thereto in the completed installation. In this relation, the said teeth 17, 18 automatically provide a pronounced positive locking biting action by digging into and becoming embedded in the opposite face of the connecting rib as shown in Fig. 8 due to the exceptional spring gripping action of the U-shaped securing elements or bent spring arms 11, 12 which operate in the manner of resilient jaws, forcing said teeth at all times to tenaciously resist any movement or displacement of the clip from its proper and most effective final applied fastening position. As illustrated in Fig. 7, the clip is advantageously concealed in the completed installation inasmuch as there is exposed only the head or base portions thereof lying substantially flush with the adjacent face of part A secured thereby. If added resilience is desired in the securing action of the clip, said base sections 13, 14, thereof may be bent slightly inwardly toward the securing elements 11, 12 in the untensioned configuration of the clip, as illustrated by the dotted line showing of Fig. 7, in which instance such base sections engage the adjacent face of part A with increased resilience to serve as yieldable take-up means in a manner whereby the juxtaposed parts are secured under continuously effective spring tension and any looseness therebetween is automatically eliminated.

Figs. 9 and 10 disclose a related form of installation in which the part P' is provided with connecting stud means in the form of one or more substantially flat stem or rib elements 5 receivable in a simple form of recess 6, in the cooperating part B from one side thereof with the general form of clip fastener 10 applied to the free end of such rib element from the opposite side of said part B. It will be understood that such recess 6 may be of any selected outline so long it is of a size suitable for receiving the securing elements or bent spring arms 11, 12 of the clip. The recess is most expediently provided in the manner of a generally round opening, as seen in Fig. 10, whereupon a clip similar in structure, operation and use to that described with reference to Figs. 1-8 inclusive is applied to the connecting rib element 6 to secure part P' to cooperating part B in a completed installation, substantially in the manner aforesaid.

Figs. 11 to 13 inclusive show another form of the invention in which the cooperating secured parts C, C', include complementary flange portions 20, 21, respectively, which when assembled in substantially abutting relation, as best seen in Fig. 13, together form a connecting rib element or the like for securing such parts in a completed installation. The clip structure itself is of the same general character as that described in detail with reference to Figs. 1 to 8 inclusive with the generally U-shaped securing elements or bent spring arms 11, 12, thereof applied to the assembled rib portions 20, 21 in straddling relation in a manner whereby the anchoring means such as teeth 17, 18, carried thereby engage opposite faces of the rib element defined by said rib portions 20, 21. The head portions 13, 14 of the clip preferably are designed to bear upon the adjacent free ends of said rib portions 20, 21, to rigidify the clip in applied fastening position and thereby add to the effectiveness of the securing action thereof.

Figs. 14 to 19 inclusive are directed to further embodiments of the invention wherein the connecting stud means to which the clip is applied is provided in the nature of a pocketed rib element or the like. Such a rib element is relatively simple in form and readily provided in the molding of a plastic part or by expedient spaced milling cuts in any other part of suitable thickness to provide the desired pocketed rib element therein. Thus, as illustrated in Fig. 14, for example, such a pocketed rib element 25 provided in part D is adapted as the means by which a cooperating part or object may be easily and quickly secured thereto by the general form of clip fastener 10 described with reference to Figs. 1-8 inclusive. The pocket or recess 26 in which the rib element 25 is disposed may be provided in any selected form, of course, so long as the side walls thereof have a suitable spacing for receiving the combined width of the generally U-shaped securing elements 11, 12, of the clip with the inner edge portions of such securing elements engaging said rib element 25 on its opposite faces substantially as shown in Fig. 17.

In Figs. 15 to 17 inclusive such a pocketed rib element is shown employed as the means by which a panel or like member F, provided with an aperture 27 is secured to said part D. The aperture 27 in part F need be only of such size as to pass the securing elements 11, 12 of the clip with the base or head portions 13, 14, thereof bearing on the adjacent surface of said part F, whereupon said securing elements 11, 12 of the clip are applied in a manner whereby the anchoring means thereon such as teeth 17, 18, engage opposite faces of the pocketed rib element 25 in securing the parts of the completed installation, substantially as in the previously described forms of the invention.

Figs. 18 and 19 illustrate modifications in which a pocketed rib element 25 provided in such part D is employed with modified forms of clips having spring arm extensions which are formed on either or both of the head or base portions 13, 14, of the clip to serve as article holding means. Thus, in Fig. 18 the base portion 13 of the clip is shown provided with a spring arm extension 31 for holding a rod, wire, cable, tube or like element in a compact, highly satisfactory securing arrangement which finds a wide and extended use in various installations such as in radio cabinets, for example, in which it is necessary or desirable that the securing means of the clip be more or less concealed and take up only a minimum of space, especially where close quarters are encountered.

Likewise, in Fig. 19 there is shown provided a similar pocketed connecting rib 26 on part D', which represents a portion of a panel bordering an opening over which it is desired to mount a cooperating panel member such as glass section G serving as the covering for a dial panel in a radio cabinet or automobile or aeroplane dashboard, for example. The head portion 14 of the clip in this instance includes a spring arm extension 32 designed to engage the adjacent rearward face of said panel G in the applied fastening position of the clip with the generally U-shaped securing elements 11, 12 thereof received in the pocket 26 and engaging the connecting rib element 25 on its opposite faces, substantially in the manner aforesaid.

Figs. 20 and 21 show a further embodiment of the invention in which the head portions 13', 14' of a modified form of clip are provided with lateral wing elements 35, 36, respectively. A clip of this character is particularly suited for use in an installation wherein a part P similar to that in Fig. 1 is provided with a connecting rib element 1 for securing the same to a cooperating part H having a simple form of slot 37 of substantially uniform width throughout its length. Such a slot is capable of receiving at any point the hump portion of the clip defined by the U-shaped securing elements 11, 12, thereof in applied fastening position, whereupon the said wing portions 35, 36 bridge the slot 37 in part H in bearing upon the adjacent surface thereof in any lengthwise position in which the securing elements 11, 12 of the clip are applied to engage the rib on part P in securing the same to said part H. A clip of this character not only makes possible the provision of a simple form of elongated slot of uniform width in supporting part H, but also provides a slidable connection of the secured parts which is most advantageous in certain installations in which adjustment thereof would be necessary or desirable. The clip otherwise embodies generally U-shaped securing elements or spring arms 11, 12, provided similar to the clip structure described in detail with reference to Figs. 1 to 8 inclusive and adapted for application and use in substantially the same manner.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In combination with a part having a body and connecting means in the form of a substantial rib, rib section, or equivalent stud element or the like, a fastening structure comprising a sheet metal strip provided with a base and an opening defining spaced longitudinal sections bordering said opening, said longitudinal sections being bent intermediate their lengths in the same general direction to one side of said base and extending away from the free end of said connecting means in spaced edge to edge relation, said bent longitudinal sections receiving said connecting means between said spaced edges in gripping engagement therewith in fastening position.

2. In combination with a part having a body and connecting means in the form of a substantial rib, rib section, or equivalent stud element or the like, a fastening structure comprising a sheet metal strip provided with a base and an opening defining spaced longitudinal sections bordering said opening, said longitudinal sections being bent intermediate their lengths in the same general direction to one side of said base and extending away from the free end of said connecting means in spaced edge to edge relation, said bent longitudinal sections receiving said connecting means between said spaced edges thereof and having means defined by at least one of said edges anchoring the same to said connecting means in fastening position.

3. In combination with a part having a body and connecting means in the form of a substantial rib, rib section, or equivalent stud element or the like, a fastening structure comprising a sheet metal strip provided with a base and an opening defining spaced longitudinal sections bordering said opening, said longitudinal sections being bent intermediate their lengths in the same general direction to one side of said base and extending away from the free end of said connecting means in spaced edge to edge relation, said bent longitudinal sections receiving said connecting means between said spaced edges and having means defined by said edges in gripping engagement with said connecting means in fastening position.

4. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating securing elements in spaced edge to edge relation and grippingly receiving said connecting means between said spaced edges in fastening position.

5. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating securing elements in edge to edge relation and having a space therebetween receiving said connecting means in fastening position, and means defined by at least one of said edges having anchoring engagement with said connecting means in such fastening position.

6. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating securing elements in edge to edge relation and having a space therebetween receiving said connecting means in fastening position, and means defined by said edges of the securing elements having gripping engagement with said connecting means in such fastening position.

7. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating securing elements in edge to edge relation and having a space therebetween receiving said connecting means in fastening position, and means including a shoulder on the edge of at least one of said securing elements anchoring the same to said connecting means in such fastening position.

8. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating securing elements in edge to edge relation and having a space therebetween receiving said connecting means in fastening position, and means including shoulders defined by said edges of the securing elements having gripping engagement with said connecting means in such fastening position.

9. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating generally U-shaped fastening elements in edge to edge relation and having a space therebetween receiving said connecting means in gripping engagement therewith in fastening position.

10. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating generally U-shaped fastening elements in edge to edge relation and having a space therebetween receiving said connecting means in fastening position, and means formed on the edge of at least one of said generally U-shaped fastening elements anchoring the same to said connecting means in such fastening position.

11. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating generally U-shaped fastening elements in edge to edge relation and having a space therebetween receiving said connecting means in fastening position, and means defined by said edges of the generally U-shaped fastening elements having gripping engagement with said connecting means in such fastening position.

12. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating generally U-shaped fastening elements in edge to edge relation and having a space therebetween receiving said connecting means in fastening position, and a shoulder on the edge of at least one of said generally U-shaped fastening elements anchoring the same to said connecting means in such fastening position.

13. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating generally U-shaped fastening elements in edge to edge relation and having space therebetween receiving said connecting means in fastening position, and one or more substantial shoulders on the edges of said generally U-shaped fastening elements having gripping engagement with said connecting means in such fastening position.

14. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating spring arms in spaced edge to edge relation and grippingly receiving said connecting means in fastening position, and an inclined substantial guide surface defined by the edge of at least one of said spring arms providing an outward taper to the space therebetween facilitating application of said spring arms to said connecting means.

15. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating spring arms in edge to edge relation and having a space therebetween receiving said connecting means in fastening position, means defined by the edge of at least one of said spring arms comprising a shoulder having anchoring engagement with said connecting means in such fastening position and an inclined substantial guide surface providing an outward taper to the space between said spring arms facilitating application thereof to said connecting means.

16. In combination with a part having a body and connecting means in the form of a substantial rib, rib section, or equivalent stud element or the like, a fastening structure comprising a sheet metal strip having a base portion and provided with an opening defining spaced longitudinal sections bordering said opening, said longitudinal sections having bent portions intermediate their lengths extending in the same general direction to one side of said base portion and away from the free end of said connecting means, said bent portions defining cooperating spring arms in edge to edge relation and having a space therebetween receiving said connecting means in fastening position, means defined by said edges of the spring arms comprising shoulders having gripping engagement with said connecting means in such fastening position and guide surfaces providing an outward taper to the space between said spring arms facilitating application thereof to said connecting means.

17. In combination with a part having a body and connecting means in the form of a substantial rib, rib section, or equivalent stud element or the like, a fastening structure comprising a sheet metal strip provided with an opening defining base portions and spaced longitudinal sections bordering said opening, said longitudinal sections having bent portions intermediate their lengths extending in the same general direction to one side of said base portions and away from the free end of said connecting means, said bent portions defining cooperating spring arms in edge to edge relation and having a space therebetween receiving said connecting means in fastening position, and means defined by said edges of the spring arms comprising teeth or the like having gripping engagement with said connecting means and guide surfaces inclined outwardly from said teeth and defining an outward taper to the space between said spring arms facilitating application thereof to said connecting means.

18. In combination, a part having a body and connecting means in the form of a substantial rib, rib section or equivalent stud element or the like, a supporting part having an aperture receiving said connecting means from one side thereof, and a fastening structure applied over the free end of said connecting means from the opposite side of said supporting part, said fastening structure comprising a sheet metal strip having a base and an opening defining spaced longitudinal sections bordering said opening, said longitudinal sections having bent portions intermediate their lengths extending in the same general direction to one side of said base and away from the free end of said connecting means, said bent portions providing cooperating securing elements in spaced edge to edge relation received in said aperture in the supporting part and grippingly receiving in the space therebetween said connecting means of said part to secure the same to said supporting part.

19. In combination with a pair of cooperating parts having bodies provided with complementary flanges or the like defining connecting means in the form of a substantial rib, rib section, or equivalent stud element or the like, a fastening structure comprising a sheet metal strip having a base and an opening defining spaced longitudinal sections bordering said opening, said longitudinal sections having bent portions intermediate their lengths extending in the same general direction to one side of said base and away from the free end of said connecting means, said bent portions defining cooperating securing elements in edge to edge relation and having a space therebetween receiving said connecting means in gripping engagement therewith in fastening position.

20. In combination with a part having a body and connecting means in the form of a substantial rib element or the like pocketed in a recess in said part, a fastening structure comprising a sheet metal strip having a base and an opening defining spaced longitudinal sections bordering said opening, said longitudinal sections having bent portions intermediate their lengths providing cooperating securing elements extending in spaced edge to edge relation in the same general direction to one side of said base and away from the free end of said connecting means, said securing elements being received in said recess in the part and grippingly receiving said rib element or the like in the space therebetween.

GEORGE A. TINNERMAN.